US008104643B2

(12) United States Patent
Pruvot

(10) Patent No.: US 8,104,643 B2

(45) Date of Patent: Jan. 31, 2012

(54) FLUID DISPENSER DEVICE

(75) Inventor: Samuel Pruvot, Saint Etienne du Vauvray (FR)

(73) Assignee: Valois SAS, Le Neubourg (FR)

( * ) Notice: Subject to any disclaimer, the term of this patent is extended or adjusted under 35 U.S.C. 154(b) by 349 days.

(21) Appl. No.: 12/446,151

(22) PCT Filed: Oct. 15, 2007

(86) PCT No.: PCT/FR2007/052149

§ 371 (c)(1), (2), (4) Date: Apr. 17, 2009

(87) PCT Pub. No.: WO2008/047032

PCT Pub. Date: Apr. 24, 2008

(65) Prior Publication Data

US 2010/0206908 A1 Aug. 19, 2010

(30) Foreign Application Priority Data

Oct. 20, 2006 (FR) ..................................... 06 54401

(51) Int. Cl.
*B67B 1/00* (2006.01)
*G01F 11/00* (2006.01)

(52) U.S. Cl. ............ 222/153.13; 222/153.06; 222/321.8

(58) Field of Classification Search ............. 222/153.01, 222/153.05–153.07, 153.11, 153.13, 153.14, 222/321.6–321.8, 541.1, 541.6; 239/333, 239/337

See application file for complete search history.

(56) References Cited

U.S. PATENT DOCUMENTS

| | | | | |
|---|---|---|---|---|
| 4,377,106 | A * | 3/1983 | Workman et al. | 92/23 |
| 4,424,919 | A * | 1/1984 | Knox et al. | 222/153.13 |
| 4,582,228 | A * | 4/1986 | Diamond et al. | 222/153.11 |
| 6,186,365 | B1 | 2/2001 | DeJonge | |
| 6,257,454 | B1 * | 7/2001 | Ritsche | 222/153.13 |
| 2007/0023452 | A1 | 2/2007 | Tseng | |
| 2007/0080173 | A1 | 4/2007 | Coe et al. | |
| 2007/0102449 | A1 | 5/2007 | Tseng | |

FOREIGN PATENT DOCUMENTS

| | | | |
|---|---|---|---|
| EP | 0 585 501 | A2 | 3/1994 |
| LU | 84 436 | A1 | 6/1983 |

* cited by examiner

*Primary Examiner* — Darren W Gorman

(74) *Attorney, Agent, or Firm* — Sughrue Mion, PLLC

(57) ABSTRACT

A fluid dispenser device having: a fluid dispenser member such as a manually-actuated pump or valve, the fluid dispenser member being fastened by a fastener ring on a reservoir; an actuator head that is mounted on the dispenser member, and that is movable so as to actuate the dispenser member; and a removable blocking element that, in its blocking position, prevents the dispenser member from being actuated. The blocking element is assembled to the actuator head and co-operates with the fastener ring, or with an element that is secured thereto, through at least one opening that is provided in the actuator head.

11 Claims, 5 Drawing Sheets

FLUID DISPENSER DEVICE

FIELD OF THE INVENTION

The present invention relates to a fluid dispenser device and more particularly to such a device including a blocking element making it possible to prevent said device being actuated between two uses.

BACKGROUND

Systems that are used to prevent a fluid dispenser device from being actuated between two actuations are well known and generally include removable devices, such as clips, that are fitted under the actuator head or pusher so as to prevent it from moving. The drawback of such a removable device is that is can sometimes become detached on its own, e.g. while being carried in a bag. Systems exist that are integrated in the device and that are not removable, but such systems are generally very complicated to make and to assemble, and require several parts of the dispenser device to be modified, thereby considerably increasing cost. Documents U.S. Pat. No. 6,186,365 and LU 84 436 describe existing devices.

SUMMARY OF CERTAIN OBJECTS OF THE INVENTION

An object of the present invention is to provide a fluid dispenser device that does not have the above-mentioned drawbacks.

More particularly, an object of the present invention is to provide a fluid dispenser device including an actuation-blocking element that is simple and inexpensive to manufacture and to assemble.

Another object of the present invention is to provide such a fluid dispenser device that can be adapted easily to existing devices and that does not require major modification of the component parts of the dispenser device.

Another object of the present invention is to provide such a device that makes it easy to see whether or not the device has already been used.

Another object of the present invention is to provide such a device that is safe and reliable to operate and that is easy for the user to actuate.

The present invention thus provides a fluid dispenser device comprising: a fluid dispenser member such as a manually-actuated pump or valve, said fluid dispenser member being fastened by a fastener ring on a reservoir; an actuator head that is mounted on said dispenser member, and that is movable so as to actuate said dispenser member; and a removable blocking element that, in its blocking position, prevents the dispenser member from being actuated; said blocking element being assembled to the actuator head and co-operating with the fastener ring, or with an element that is secured thereto, through at least one opening that is provided in the actuator head.

Advantageously, said blocking element is movable in translation, transversally relative to the longitudinal axis of the dispenser member.

Advantageously, the blocking element includes at least one blocking projection passing through said at least one opening.

Advantageously, said blocking element includes at least one breakable element that is adapted to break when the blocking element is removed for the first time from its blocking position.

Advantageously, said at least one breakable element is formed by a tab that co-operates with at least one edge of said at least one opening.

Advantageously, said head includes at least two openings of which at least one receives a blocking projection and at least one receives a breakable element.

In the blocked position, the blocking element advantageously extends around said head, at least in part.

Advantageously, the blocking element comprises an open ring that includes two blocking projections of which each end edge is provided with a breakable element, said head including four openings of which two receive said blocking projections in the blocked position, and two receive said breakable elements in the blocked position before first use.

Advantageously, the blocking element includes two substantially parallel branches, said branches forming two blocking projections, and each of the free ends of said branches including a breakable element, said head including four openings, each branch, in the blocked, penetrating inside the head via a first opening and exiting the head via a second opening, each breakable element co-operating with said second opening in the blocked before first use.

Advantageously, the blocking element is held in its blocking position by retaining means, said retaining means being elastically deformable.

Advantageously, said retaining means are formed by said open ring co-operating with the peripheral surface of the head.

Advantageously, said retaining means are formed by at least one retaining projection co-operating with at least one opening of the head.

In the blocked position, the blocking element advantageously co-operates with the top surface of the fastener ring or with an element that is secured to said ring.

Advantageously, said blocking element includes at least one grip means.

BRIEF DESCRIPTION OF THE DRAWINGS

Other characteristics and advantages of the invention appear more clearly from the following detailed description of two advantageous embodiments of the present invention, given by way of non-limiting example, and with reference to the accompanying drawings, in which.

DETAILED DESCRIPTION OF EXEMPLARY EMBODIMENTS OF THE INVENTION

Figure 1:
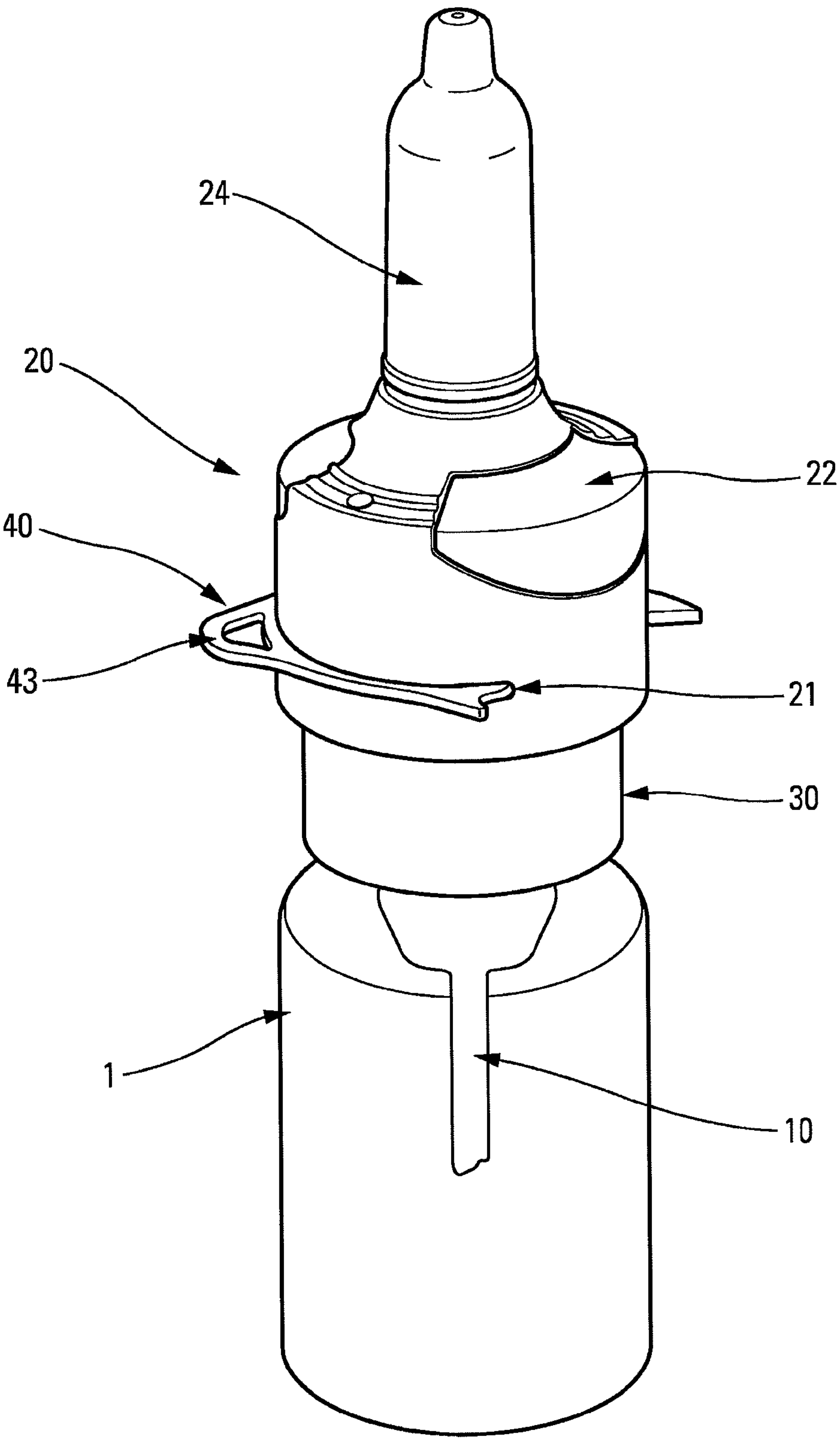
FIG. 1 is a diagrammatic perspective view of a fluid dispenser device constituting a first embodiment, in its blocked position.

With reference to the figures, the dispenser device includes a dispenser member 10 that is a pump, in the embodiment shown in the figures. Naturally, the invention could apply to any type of dispenser member, and in particular also to valves. The pump can be assembled on a reservoir 1 by means of a fastener ring 30 that can be of any type, and in particular screw fastenable, crimpable, or snap-fastenable. The ring could be a specific separate part or it could be formed integrally with a portion of the device. A pusher or actuator head 20 is movably mounted on the pump so as to actuate said pump. In the embodiment shown in the figures, the actuator head is a nasal pusher that includes an elongate portion 24 for penetrating into the nostril, and a bearing zone 22 on which the user presses so as to actuate the device. Naturally, the embodiment shown in the figures, in particular the type of pump or the type of pusher, is absolutely not limiting, and, on the contrary, the present invention can apply to any type of fluid dispenser device.

Figure 4:
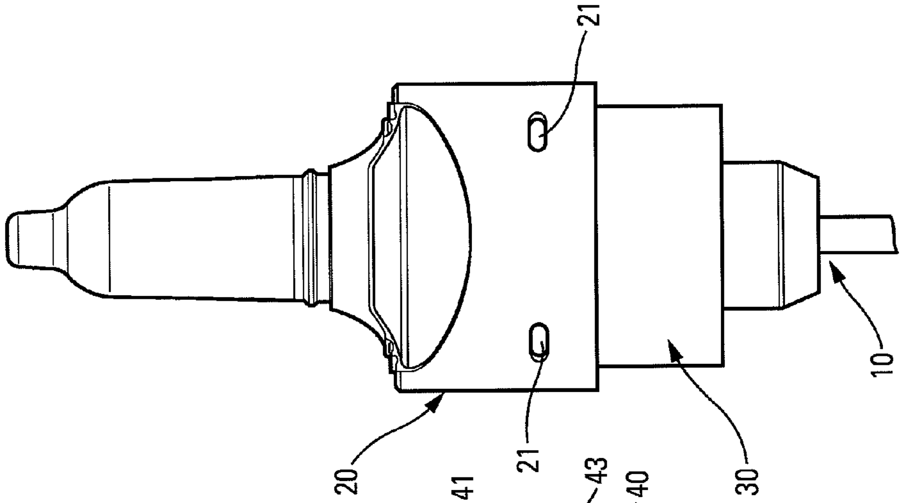
FIG. 4 is a diagrammatic view similar to the view in FIG. 2, without a blocking element.
Figure 9:
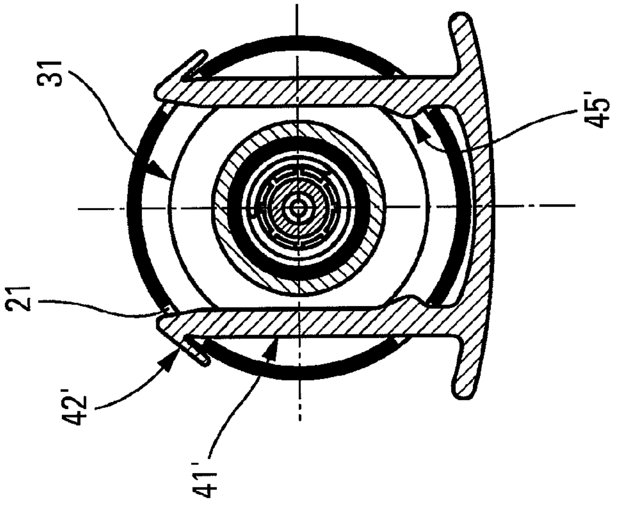
FIGS. 7, 8, and 9 are horizontal sections showing the positioning of the blocking element on the dispenser device, in a second embodiment, respectively before, during, and after its insertion via the openings in the actuator head.
Figure 10:
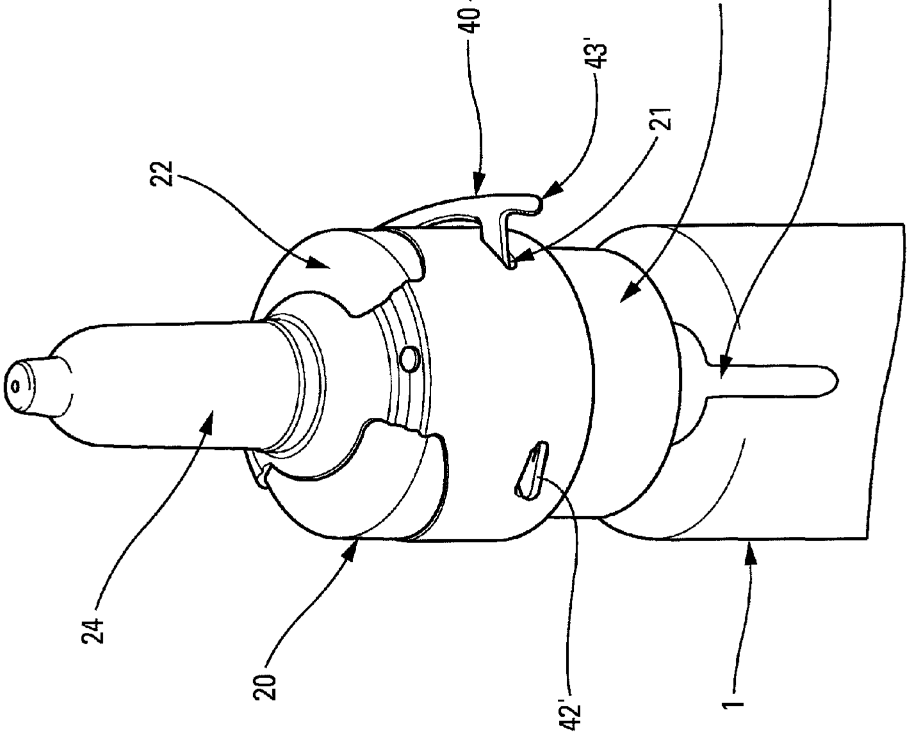
FIG. 10 is a diagrammatic perspective view of a dispenser device constituting the second embodiment, shown in its blocked position.
Figure 11:
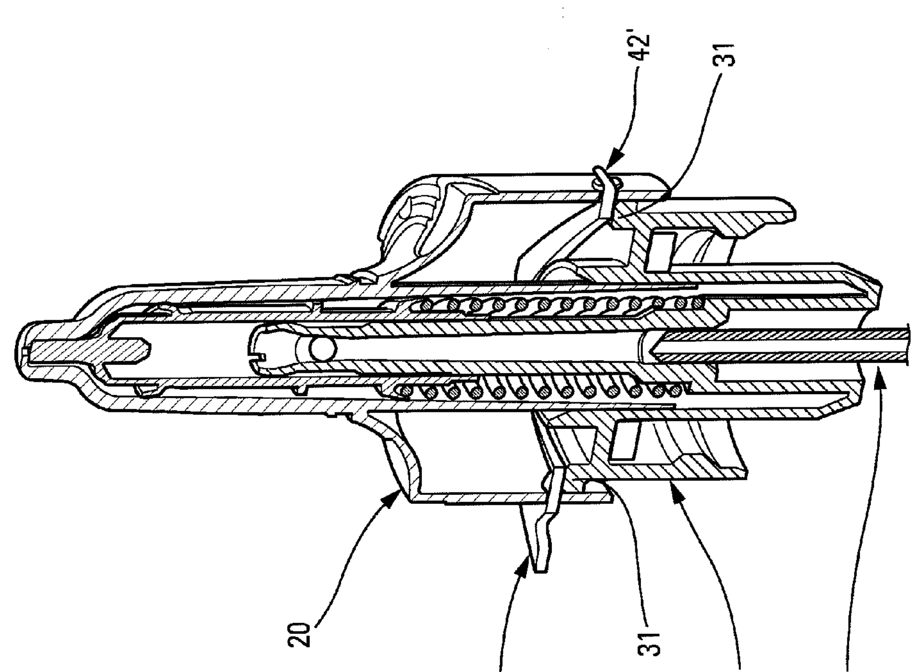
FIG. 11 is a diagrammatic section view of the FIG. 10 device.

In the invention, the device includes an actuation-blocking element 40 that is assembled in removable manner on the device. In the blocked position shown in FIGS. 1, 2, 3, and 6 and in FIGS. 9, 10, and 11, the blocking element prevents the pump from being actuated, in particular by preventing the actuator head 20 from moving relative to the pump. In the element-withdrawn position shown in FIGS. 4 and 5 and in FIG. 7, the pump can be actuated. In the blocked position, the blocking element 40 is preferably assembled to the actuator head 20, as shown in FIGS. 1 and 10. The actuator head includes at least one opening 21 through which the blocking element 40 is adapted to co-operate with the fastener ring 30. The blocking element could thus co-operate with an element that is fastened or secured to said fastener ring.

Advantageously, the blocking element 40 also includes means that serve to indicate first use, so as to show whether the blocking element 40 has already been removed from its blocking position.

Advantageously, the blocking element 40 is movable transversally relative to the longitudinal axis of the dispenser member 10. At least one grip means 43 for gripping the blocking element make it easy for the user to put the blocking element into place on the actuator head, or to remove it therefrom.

Figure 5:
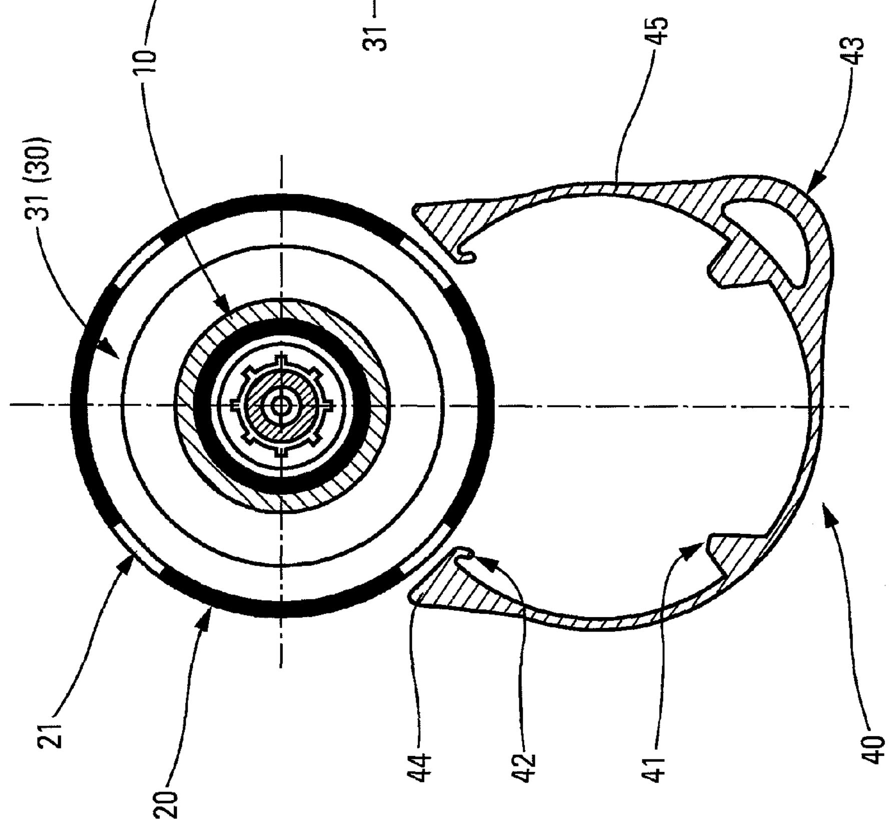
FIG. 5 is a horizontal section view of the device, before the blocking element has been assembled to the actuator head.

In the first embodiment, the blocking element 40 comprises an elastically-deformable open ring 45 for assembling around the head 20. FIG. 5 shows the open ring 45 before it is mounted on the head 20. In this embodiment, the open ring 45 includes two blocking projections 41, and each end edge 44 of the ring can be provided with a breakable element 42 that serves to indicate first use. The two projections and the two breakable elements project towards the inside of the open ring 45.

Figure 6:
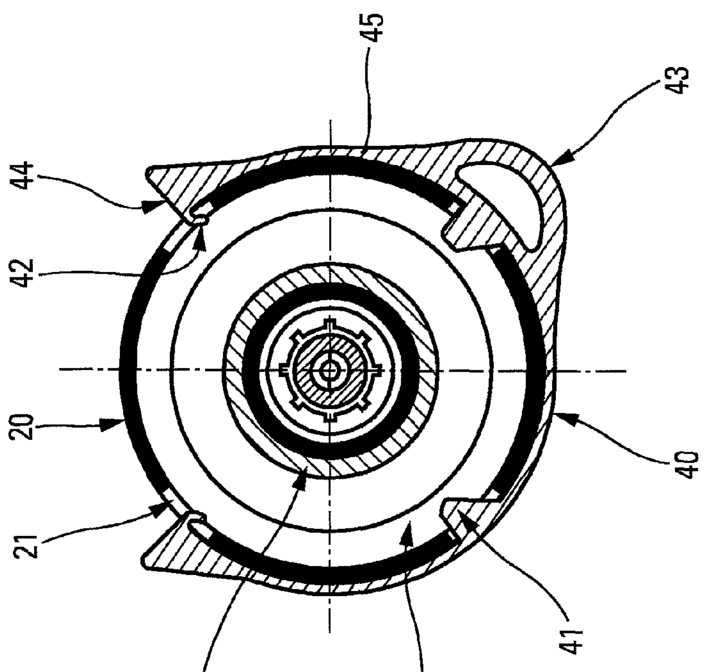
FIG. 6 is a view similar to the view in FIG. 5, showing the dispenser device after the blocking element has been assembled in its blocking position, and before it is used for the first time.

After being assembled to the head, i.e. in its blocking position, and before the dispenser device is used for the first time, the ring 45 extends around the actuator head 20, at least in part, as shown diagrammatically in FIG. 6. In the embodiment shown, the side wall of the actuator head includes four openings 21 of which two receive said blocking projections 41 in the blocked position, and the other two receive said breakable elements 42 in the blocked position before first use. Naturally, the invention is not limited to the embodiment shown in the drawings, and it is possible to envisage a different number of blocking projections and/or of breakable elements, and corresponding openings in the actuator head.

Figure 3:
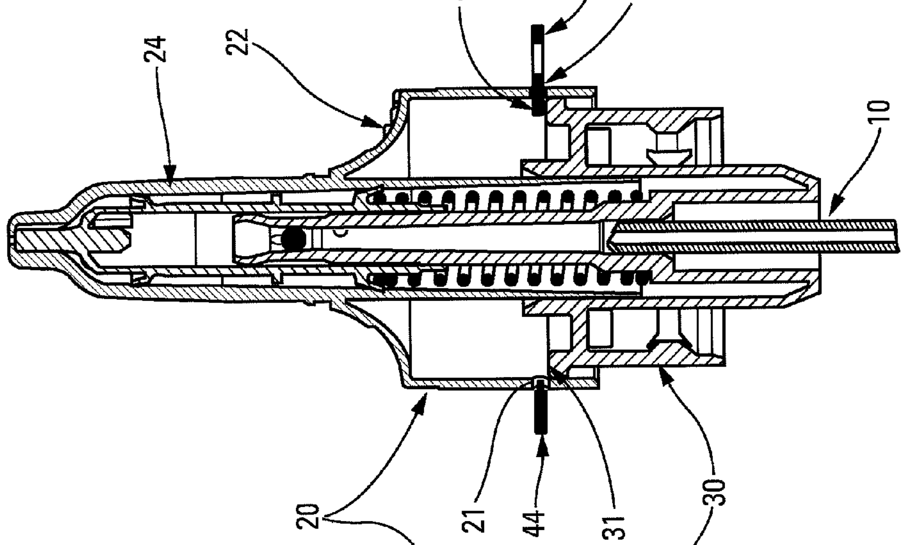
FIG. 3 is a diagrammatic section view of FIG. 2.
Figure 2:
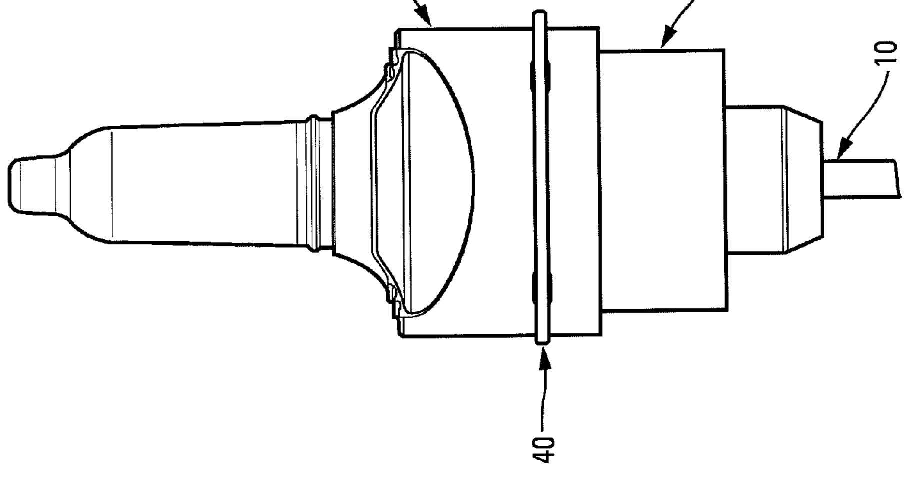
FIG. 2 is a diagrammatic side view of the FIG. 1 device, in its blocked position.

As shown in FIGS. 3 and 6, in the blocked position, the blocking element co-operates by means of its blocking projections 41 both with a top surface or a rim 31 of the fastener ring 30 (or with an element that is secured thereto), and with the openings 21 in the actuator head 20, so as to prevent the head 20 from moving axially relative to the ring 30. The blocking projections 41 extend from the circumference of the open ring 45, through the openings 21 in the head, and onto the rim 31 of the fastener ring 30, perpendicularly to the axis of sliding between the head 20 and the fastener ring 30.

During first use, i.e. when the blocking element 40 is removed for the first time from its blocking position, the two breakable elements 42, situated at each end edge 44 of the ring, are adapted to break or to deform. As shown in FIGS. 5 and 6, the breakable elements can be formed by two tabs 42. The tabs co-operate with the edge of the openings 21 in the head in such a manner that, in this embodiment, they are separated from the blocking element under the effect of the blocking element 40 being removed by the user. The presence of intact tabs 42 thus guarantees to the user that the blocking element has yet to be removed from its blocking position. Thus, it is certain that the device has never been actuated.

After first use, the open ring 45 can be put back into place in its blocking position. It suffices for the user to snap-fasten the open ring around the actuator head 20. Snap-fastening can be facilitated by the shape of the edges of the two ends 44. As shown in FIG. 5, the two end edges 44, when put into contact with the actuator head 20, are substantially tangential to the circular wall of the head, so as to make it easier for the ends of the ring to slide around the head until they become snap-fastened. The shape of the edges of the ends of the ring also presents the advantage of not damaging the actuator head during successive snap-fastenings and unfastenings. Once snap-fastened, the open ring thus extends once again around the actuator head, at least in part, with each blocking projection 41 co-operating with the fastener ring or with an element secured thereto, through one of the openings 21 in the actuator head, so as to prevent the pump from being actuated.

Advantageously, the blocking element is made of plastics material that is both strong, so as to enable the blocking element to be reusable, and deformable, so as to enable the blocking element to be snap-fastened and unfastened. Other materials can also be envisaged.

Advantageously, the four openings 21 in the actuator head shown in the figures are distributed in symmetrical manner about the longitudinal axis of the dispenser member, specifically the pump in the embodiment shown. The two blocking projections 41 and the two tabs 42 that are adapted to co-operate with the four openings in the actuator head are also advantageously positioned in symmetrical manner on the open ring relative to the center of the ring. The blocking element 40 of the invention can thus be engaged on the actuator head via any side. This embodiment is simple and rapid to assemble since it is not necessary to orientate each actuator head while assembling the blocking element on the head. In addition, it is very easy for the user to put the blocking element back into place after each use. It suffices to snap-fasten the ring, if necessary turning it slightly around the head, until each blocking projection can be inserted into any one of the openings in the actuator head.

Figure 8:
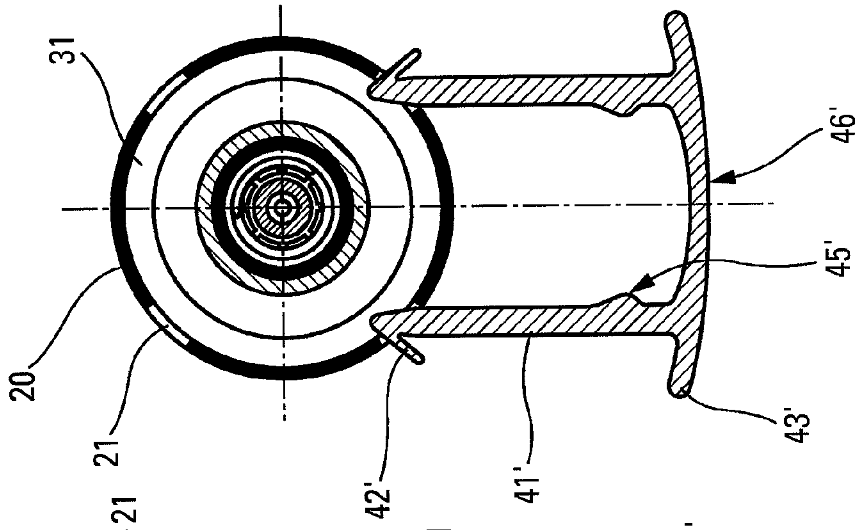
Figure 7:
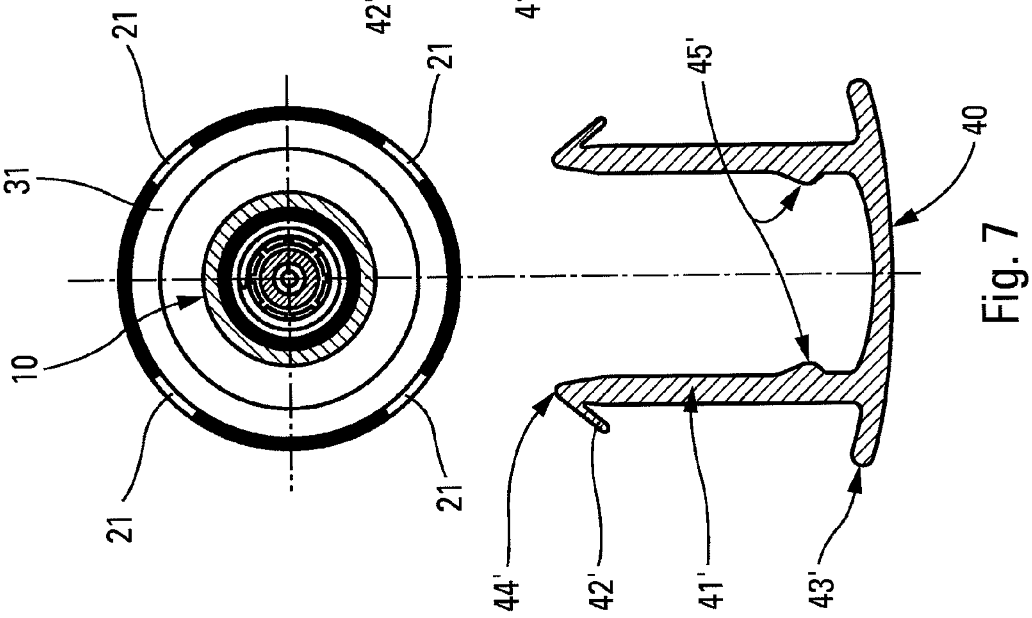

In a second embodiment, the blocking element includes two substantially parallel branches 41' that constitute two blocking projections. The blocking element presents a U-shape, as shown in FIGS. 7 to 9. The transverse wall 46' that interconnects the two parallel branches 41' of the blocking element can overhang on either side of the base of the branches, so as to form the grip means 43'. Each of the free ends 44' of the branches includes a breakable element 42' that is formed by a tab in the embodiment shown. As in the first embodiment, the actuator head 20 includes four openings 21 that may be disposed symmetrically about the longitudinal axis of the head. During assembly into the blocked position, each branch 41' penetrates inside the head 20 via a first opening 21, passes through the space situated between the dispenser member 10 and the inside wall of the head, and exits the head via a second opening 21. In the blocked position, each branch thus co-operates both with two openings in the actuator head, and with the rim 31 of the fastener ring 30, or with an element that is secured thereto, perpendicularly to the axis of actuation. Before first use, each breakable element co-operates with the edge of an opening. While the blocking element is being removed for the first time, the tabs 42' are retained outside the actuator head by the edges of said respective second openings 21 against which they break. In this embodiment, the breakable element 42' is situated outside the head and presents the advantage of constituting a first-use indicator that is directly visible. During subsequent uses, the U-shaped blocking element can be engaged easily via two openings in the head, by sliding the branches over the rim 31 of the fastener ring 30. In a variant, after first use, and thus in the absence of the first-use indicator means, the blocking element need not exit the head via the second openings.

Advantageously, the blocking element is held in its blocking position by retaining means, so as to prevent the blocking element from becoming disengaged very easily from the actuator head. The retaining means can be elastically deformable. As in the first embodiment, they can consist of an open ring 45 co-operating with the outer peripheral surface of the actuator head 20. As shown in FIG. 9, the retaining means can alternatively comprise at least one retaining projection 45' that is situated on a blocking projection 41'. FIG. 9 shows two retaining projections 45' forming two symmetrical shoulders on respective ones of the two blocking projections 41'. Each retaining projection co-operates with the inside wall of the actuator head 20, creating a kind of snap-fastening, and prevents the blocking element from exiting the actuator head. In order to remove the blocking element, the user must exert a threshold traction force that overcomes said retaining projections. As a result of the retaining means, the blocking element remains in its blocking position, thereby enabling the dispenser device to be carried safely, without risk of being actuated by accident.

Whatever the embodiment, the blocking element of the present invention can advantageously be applied to any existing fluid dispenser devices, with the only modification needed to the devices being the creation of holes in the actuator head.

The present invention is described above with reference to two advantageous embodiments thereof, but naturally it is not limited to the embodiments shown in the drawings. Modifications could be envisaged by the person skilled in the art, without going beyond the ambit of the present invention, as defined by the accompanying claims.

The invention claimed is:

1. A fluid dispenser device comprising:

a fluid dispenser member, said fluid dispenser member being fastened by a fastener ring on a reservoir;

an actuator head that is mounted on said dispenser member, and that is movable so as to actuate said dispenser member; and a removable blocking element that, in its blocking position, prevents the dispenser member from being actuated;

said blocking element is assembled to the actuator head and co-operates with the fastener ring, or with an element that is secured thereto, through at least one opening that is provided in the actuator head;

in the blocking position, the blocking element extends around said head, at least in part; and the blocking element comprises an open ring or U-shaped structure that includes two blocking projections; and each end of the open ring or U-shaped structure is provided with a breakable element, said head including four openings of which two receive said blocking projections in the blocking position, and two receive said breakable elements in the blocking position before first use.

2. A device according to claim 1, wherein said blocking element is movable in translation, transversally relative to a longitudinal axis of the dispenser member that runs along a direction of actuation of the dispenser member.

3. A device according to claim 1, wherein the blocking element is held in its blocking position by retaining means, said retaining means being elastically deformable.

4. A device according to claim 3, wherein said retaining means are formed by said open ring co-operating with the peripheral surface of the head.

5. A device according to claim 3, wherein said retaining means are formed by at least one retaining projection co-operating with at least one of said openings of the head.

6. A device according to claim 1, wherein, in the blocking position, the blocking element co-operates with the top surface of the fastener ring or with an element that is secured to said ring.

7. A device according to claim 1, wherein said blocking element includes at least one grip means.

8. The device according to claim 1, wherein fluid dispenser member is a manually-actuated pump or valve.

9. A fluid dispenser device comprising:

a fluid dispenser member, said fluid dispenser member fastened by a fastener ring on a reservoir;

an actuator head mounted on said dispenser member, and that is movable so as to actuate said dispenser member; and a removable blocking element that, in its blocking position, prevents the dispenser member from being actuated;

said blocking element is assembled to the actuator head and co-operates with the fastener ring, or with an element that is secured thereto;

the blocking element includes two substantially parallel branches, said branches forming two blocking projections, and each of the free ends of said branches including a breakable element, said head including four openings, each branch, in the blocking position, penetrating inside the head via a first opening and exiting the head via a second opening, each breakable element co-operating with a respective one of said second openings in the blocking position before first use and is adapted to break when the blocking element is removed for the first time from its blocking position.

10. A device according to claim 9, wherein each of said breakable elements is formed by a tab that co-operates with at least one edge of the respective one of said second openings.

11. The device according to claim 9, wherein fluid dispenser member is a manually-actuated pump or valve.

* * * * *